United States Patent [19]

Franchi et al.

[11] 4,001,539

[45] Jan. 4, 1977

[54] CONTROL SYSTEMS FOR WELDING MACHINES

[75] Inventors: Adriano Franchi; Paolo Brandani, both of Tavarnelle Val Di Pesa (Florence), Italy

[73] Assignee: Axis S.p.A., Tavarnelle Val Di Pesa (Florence), Italy

[22] Filed: Nov. 12, 1974

[21] Appl. No.: 523,278

[30] Foreign Application Priority Data

Nov. 13, 1973 Italy .................................. 9679/73

[52] U.S. Cl. .............................................. 219/110
[51] Int. Cl.² ........................................ B23K 11/24
[58] Field of Search .......... 219/108, 109, 110, 111, 219/114

[56] References Cited

UNITED STATES PATENTS

| | | | |
|---|---|---|---|
| 3,240,961 | 3/1966 | Noth | 219/110 |
| 3,389,239 | 6/1968 | Treppa et al. | 219/110 |
| 3,504,157 | 3/1970 | Vanderhelst | 219/110 |
| 3,875,367 | 4/1975 | Tanaka | 219/108 |

Primary Examiner—Thomas J. Kozma
Assistant Examiner—Clifford C. Shaw
Attorney, Agent, or Firm—Hopgood, Calimafde, Kalil, Blaustein & Lieberman

[57] ABSTRACT

A welding machine is described in which current to the welding electrodes is controlled by an S.C.R. unit. The S.C.R. unit is provided with control pulses in accordance with a predetermined program so that the power fed to the welding electrodes should follow a predetermined characteristic. A simulator is provided to simulate from the control pulses, the energy characteristic that the welding electrodes should follow. The actual energy characteristic of the electrodes is monitored. If the actual energy characteristic falls outside the simulated characteristic, a fault signal is generated.

4 Claims, 5 Drawing Figures

CONTROL SYSTEMS FOR WELDING MACHINES

BACKGROUND OF THE INVENTION

The invention relates to control systems for welding machines, and more particularly to welding machines operating automatically in accordance with a desired program.

It is an object of the invention to provide an improved control system for a welding machine. It is a further object to provide a control system which controls the machine in accordance with a preset program and monitors the actual performance of the machine while following the program.

SUMMARY OF THE INVENTION

According to the invention, there is provided in a welding machine having welding electrodes, an electronic control system comprising an electrical supply source, a current control unit connected to supply current from the supply source to the welding electrodes and having a control input for controlling current fed to the welding electrodes, a pulse generator connected to supply control pulses to the control input at the control unit so that by varying the phase of the pulses, the current fed to the welding electrodes is also varied, sensing means connected to sense the instantaneous power consumed by the welding electrodes and arranged to provide an output in dependence thereon, integrating means connected to receive the output from the sensing means and arranged to provide an output indicative of the total power consumed by the welding electrodes, means for generating a reference signal indicative of the desired total energy to be fed to the welding electrodes, comparison means for comparing the reference signal with the output from the integrating means and operative when equality is reached to inhibit the supply of control pulses from the generator to the current control unit, and simulating means having first means connected to receive a proportional signal to the ideal current of weld from the pulse generator, such a signal being proportional to the sine curve area supplied t the transformer which generates a prefixed current in the ideal case with constant weld resistance, second means responsive to the output of the first means and the reference signal and operative to generate an output when equality is detected, and third means responsive to the output of the second means and the comparison means to generate a fault indicating signal and to inhibit the pulse generator when the output of the third means occurs prior to the output of the comparison means.

BRIEF DESCRIPTION OF THE DRAWINGS

A welding machine embodying the invention will now be described by way of example, with reference to the accompanying diagrammatic drawings in which.

DESCRIPTION OF THE PREFERRED EMBODIMENT

Figure 1:
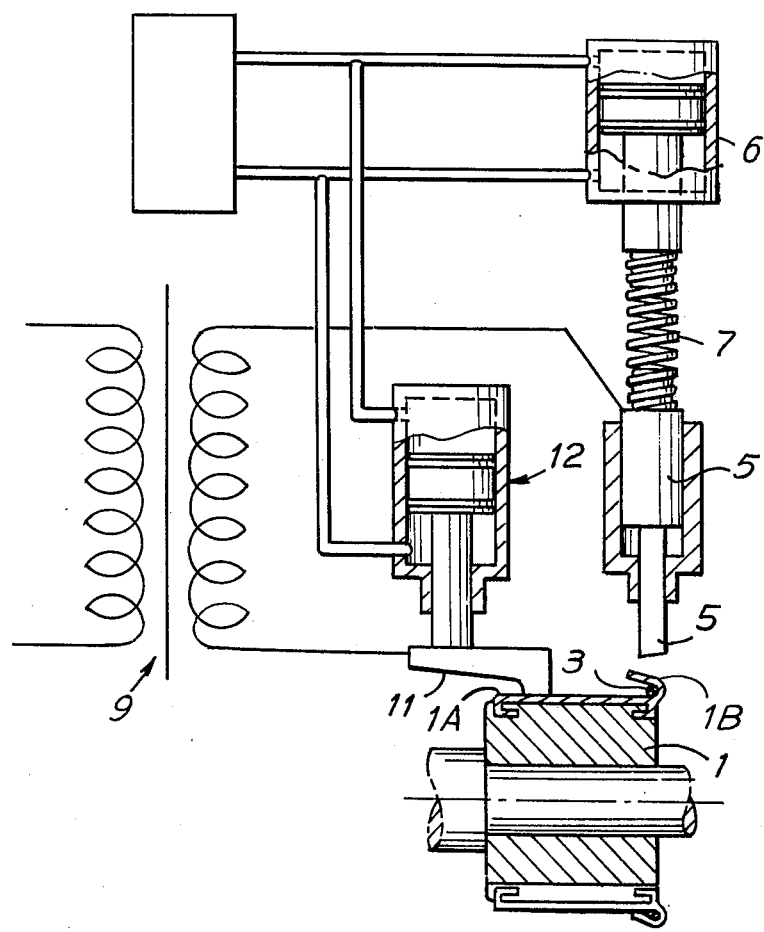
FIG. 1 is a partially sectioned front elevation of the welding machine acting to weld a wire to a commutator segment of an electrical machine.

As shown in FIG. 1 the welding machine is acting to weld one end portion of an enameled wire 3 (forming a winding of an electrical machine) to a commutator segment 1A of the electrical machine. The segment 1A has hook portion 1B which is arranged to be deformed around the end portion of the wire 3. The welding machine includes a movable electrode 5 made of tungsten and which is arranged to engage the hook portion 1B under the control of a cylinder and piston arrangement 6. The electrode 5 is biased towards the hook portion 1B by a spring 7. The welding machine is powered from a booster transformer 9. One end of the secondary winding is connected to electrode 5 while the other end is connected to a copper electrode 11. The copper electrode 11 is urged against the commutator segment 1A by a cylinder and piston arrangement 12.

Figure 2:
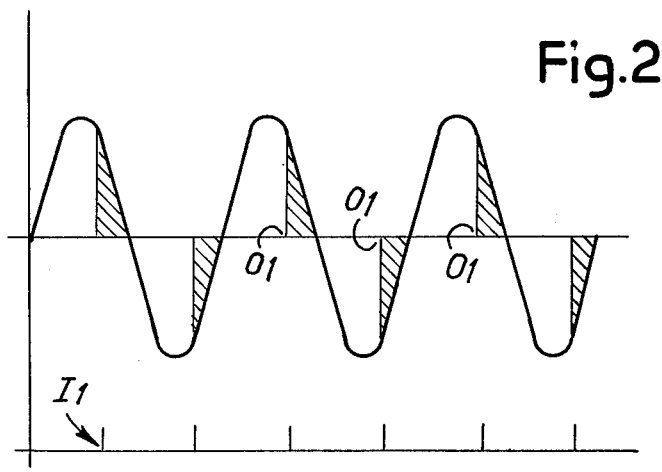
FIGS. 2 and 3 illustrate waveforms of control pulses for the welding machine.
Figure 3:
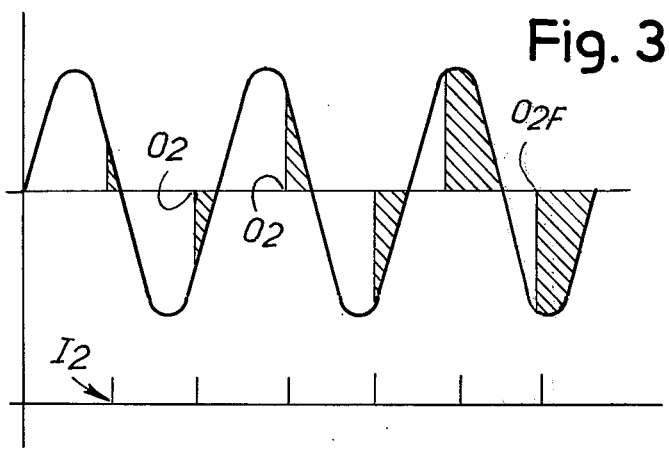
Figure 5:
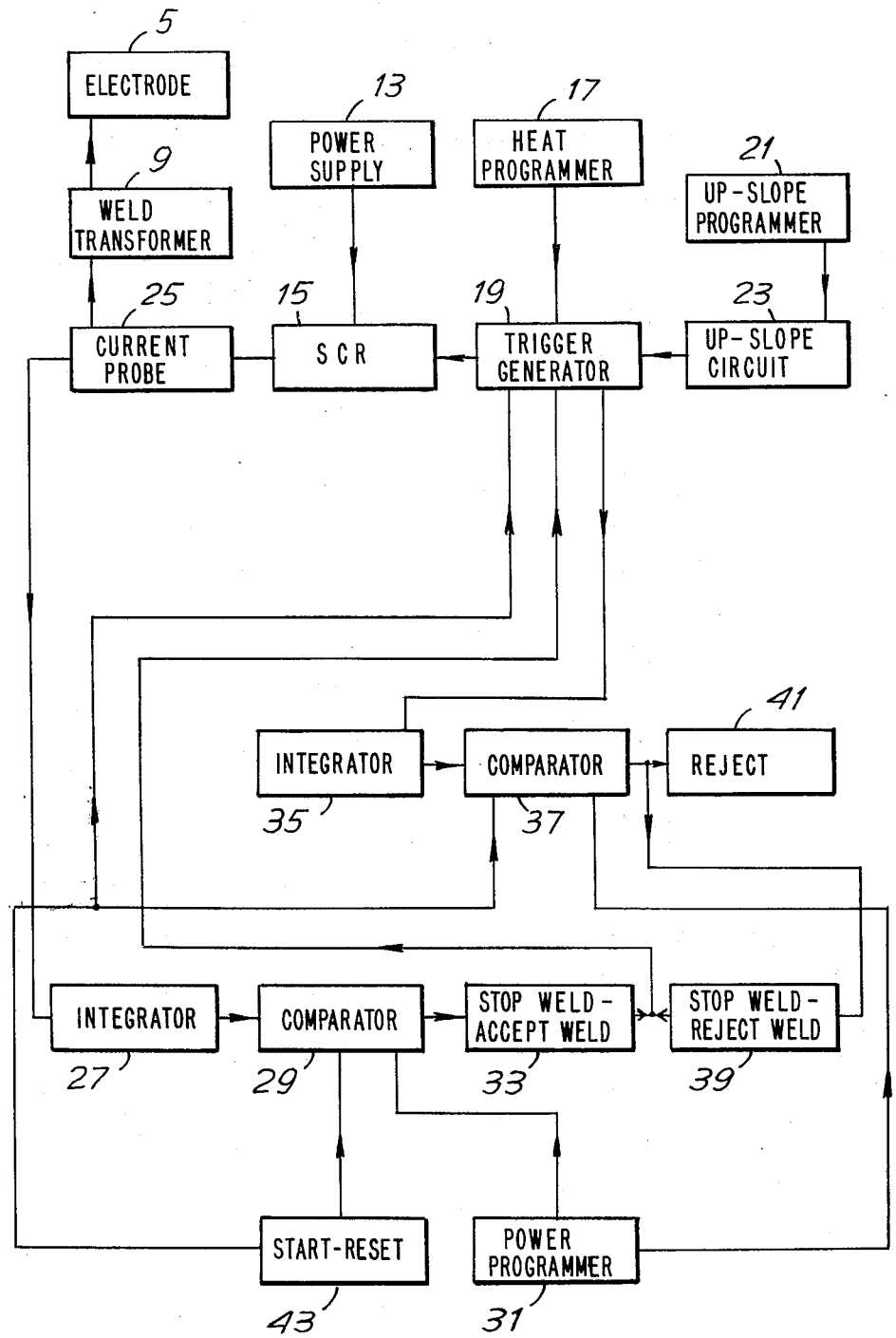
FIG. 5 is a block diagram of the programming and control system of the machine.

The control system of the welding machine shown in the block diagram of FIG. 5 includes a power supply 13 which feeds power to the primary winding of the transformer 9 through a S.C.R. (silicon controlled rectifier) unit 15. The power supply 13 provides a sinusoidal output which is chopped by the silicon controlled rectifier unit 15 as indicated in FIGS. 2 and 3. Thus, variation of the point in each cycle at which the S.C.R. unit 15 is triggered varies the amount of power which is passed to transformer 9. The shaded areas in FIGS. 2 and 3 indicate the amount of current that the transformer receives.

FIG. 2 illustrates the triggering pulses $I_1$ for triggering the S.C.R. unit 15 in a first mode. The pulses indicated $I_1$ are fixed phase shifted with respect to that of the power supply. Thus, the S.C.R. unit 15 is rendered conductive at the instant $O_1$ during each half-wave cycle.

FIG. 3 illustrates triggering pulses $I_2$ for triggering the S.C.R. unit in another mode. The pulses $I_2$ are of variable phase shift and are so arranged as to advance the triggering instant $O_2$ of the S.C.R. unit 15 in each successive cycle. By this means more power can be fed to the transformer with each successive cycle so that the electrode of the welding machine is gradually brought up to the desired temperature.

The pulses $I_1$ are generated by a trigger or pulse generator 19 (FIG. 5) under the control of a heat programmer 17 which varies the phase of the pulses in accordance with a predetermined program. The initial variable phase shifting of the triggering pulses can also be controlled by a programming unit 21 through a control unit 23 to produce the pulses $I_2$.

The current fed by the S.C.R. unit 15 to the transformer 9 is monitored by a probe 25 to provide feedback information. The output from the probe is fed to an integrating unit 27. The output from the integrating unit 27 is compared with a reference level generated from a power programming unit 31 by a comparator 29. When the comparator 29 senses equality it generates a signal to a stop weld-accept weld unit 33. Upon receipt of this signal, the unit 33 acts to block further triggering pulses from the generator 19 and so current to the welding electrodes is discontinued.

The control system also includes an auxiliary circuit which simulates the welding circuit. The auxiliary circuit includes an integrating unit 35 which is connected to receive and sum the signals which are proportional to the ideal current of weld from the trigger generator 19; the integrator unit 35 thus simulates the integrating unit 27. The output from the integrating unit 35 is compared with the reference signal from the power programming unit 31 by a comparator 37. When equality is detected by the comparator 37 a stop weld-reject weld signal is fed to both a reject unit 39 and a unit 41. Upon receipt of this signal, the unit 39 (which is analogous to the unit 33) acts to block further triggering pulses from the generator 19. Upon receipt of the signal, the unit 41 acts to reject the members being welded. It will thus be appreciated that if the comparator 29 generates an output before the comparator 37 this indicates that a weld has been completed within the limits defined by programming unit 31 and so a successful weld has taken place. If, however, the comparator 37 generates an output before the comparator 29, this indicates that the weld has not been completed within the limits defined by the programming unit 31 and so the weld must be rejected as being successful.

A reset unit 43 is arranged to reset the generator 19 and the two comparators 29 and 37 at the start of each welding operation.

The welding machine of FIG. 1 acts to weld or hot-forge the copper enameled wire 3 to the segment 1A of the copper commutator of the electric motor. In preforming this task it deforms the hook portion 1B as well as removes the insulating enamel from the wire 3 at the point of contact with the hook portion 1B. In performing this task the secondary winding of the transformer 9 drops to about 3 to 5 volts, to feed a high current to the tungsten electrode 5. The passage of this high current in the welding circuit heats the electrode 5 to first soften the hook portion 1B. The thrust of the spring 7 is such that the hook portion 1B is deformed around the wire 3. During this process, the temperature attained burns the enamel from the wire 3 and provides electrical contact in the contact zone between the hook portion 1B and the wire 3.

In order to obtain a good weld the following conditions should advantageously be satisfied:
  a. The total power delivered during the welding operation should be limited to avoid too great a concentration of energy which would have a destructive effect on the parts being welded;
  b. the instantaneous power supplied during each welding cycle should not exceed a predetermined maximum;
  c. the power supplied to produce the welding should be gradually increased at the start of the welding cycle;
  d. the whole welding cycle should be controlled to take place in accordance with a predetermined program.

These conditions are satisfied by the welding machine illustrated.

The welding cycle is begun by operating the reset unit which enables the pulse generator 19 and resets the two comparators 29 and 37. The pulse generator 19, which is synchronized with the supply grid frequency, generates triggering pulses to trigger the S.C.R. unit 15, and acts to control the maximum power fed to the welding circuit and to exclude any excessive concentration of power which could have destructive effects. The units 15, 17, 19 thus reduce the maximum power that could be delivered to the transformer in the absence of the S.C.R. unit. The maximum power is represented by the total area within the sinusoids of FIGS. 2 and 3. However, the actual power delivered to the transformer is controlled by the triggering pulses from the pulse generator 19 and as indicated by the hatched areas under the sinusoids in FIGS. 2 and 3, is an adjustable "percentage" of the full sinusoid. The sinusoid percentage is programmed by means of the heat programmer 17 which limits the maximum instantaneous power. Thus, in the graph of power versus time (energy) in FIG. 4, the area ED exceeds the limits imposed by the programmers 17 and 31. The optimum characteristic of power versus time (energy) in a welding cycle is represented by the area EG. If too little power is provided over too long a period of time as indicated by the area EI in FIG. 4, the weld will not be successful and such a condition is determined by the auxiliary simulating circuit formed by the units 35, 37, 39 and 41.

The control unit 23 which is programmed by the unit 21 is designed gradually to increase the heat supplied to the parts to be welded from a minimum to a maximym value. This control is illustrated with reference to FIG. 3. Thus at the start of a welding cycle, the maximum power is not immediately supplied but the value of the power is gradually increased over a predetermined time by progressively increasing the instant during successive cycles of the supply at which the S.C.R. unit is triggered. This continues until the point $O_{2F}$ in FIG. 3 is reached. The initial temperature of the parts to be welded is low so that deformation of the hook portion 1B can take place without hardening of the copper. After a sufficient period of time to allow deformation to take place, the temperature is increased and the insulating enamel is evaporated from the wire 3. The supply current 13, which is passed by the S.C.R. unit 15, is monitored by the probe 25. The probe 25 measures the current circulating in the welding circuit and passes the information to the integrating unit 27. The output from the integrating circuit 27 is a signal having a value which is proportional to the total power fed to the welding circuit.

The signal proportional to the total power is compared by the comparator 29 with a signal generated by the programming unit 31 and represents the maximum total power to be supplied to the weld. When the two signals are equal, welding is stopped.

Figure 4:
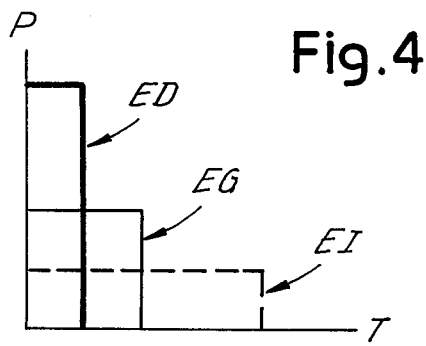
FIG. 4 is a step graph indicating possible modes of powering the welding machine.

In order to ensure that the apparatus is working correctly as described, and to prevent the desired amount of power being delivered over too long a period as represented by the area EI in FIG. 4, an ideal welding is simulated with the auxiliary welding circuit 35, 37, 41 which operates in parallel with the actual welding circuit. In this simulated circuit the pulse generator 19 supplies signals to the integrating unit 35. The integrating unit 35 provides an output signal proportional to the energy which should have been supplied by the S.C.R. unit to the transformer 9. The output signal of the integrating unit 35 is compared by the comparator 37 with the reference signal coming from the programming unit 31. If, for some reason, the comparator 37 detects equality (that is when the time for the optimum welding cycle expires) before the comparator 29, this means that the actual welding circuit is not functioning correctly. As a result, therefore, the welding is stopped by means of the unit 39 acting on the pulse generator 19 and a rejection signal is supplied to the reject unit 41. The unit 41 thereupon indicates that a malfunction has taken place and/or rejects the presumably faulty weld.

The probe 25 may take the form of a current transformer or other transducer for monitoring the energy supplied to the transformer 9.

It will be understood that other modifications can be made to the invention without departing from the spirit and scope of the invention as defined by the appended claims.

What is claimed is:

1. In a welding machine having welding electrodes an electronic control system comprising
   an electrical supply source,
   a current control unit connected to supply current from said supply source to the welding electrodes and having a control input for controlling current fed to the welding electrodes,
   a pulse generator connected to supply control pulses to said control input of said control unit so that by varying the phase shift of the pulses, the current fed to the welding electrodes is also varied,
   sensing means connected to sense the instantaneous current consumed by the welding electrodes and arranged to provide an output in dependence thereon,
   integrating means connected to receive the output from said sensing means and arranged to provide an output indicative of the total current supplied to the welding electrodes,
   means for generating a reference signal,
   comparison means for comparing the reference signal with the output from said integrating means and operative when equality is reached to inhibit the supply of control pulses from said pulse generator to the current control unit, and simulating means having
   first means connected to receive a signal from said pulse generator and operative in response thereto to provide an output representative of the total power that the welding electrodes would be expected to consume as a result of the control pulses,
   second means responsive to the output of said first means and said reference signal and operative to generate an output when equality is detected, and
   third means responsive to the output of said second means and said comparison means to generate a fault indicating signal and to inhibit said pulse generator when the output of said second means occurs prior to the output of said comparison means.

2. A welding machine according to claim 1, wherein said simulating means includes
   an integrator connected to receive said output from said integrator with the output from said reference signal generating means, said comparator upon detecting equality generating a first signal to inhibit said pulse generating means from supplying pulses to said current control unit and a second signal indicating a fault.

3. A welding machine according to claim 1, including a programming unit connected to control the pulse generator to generate pulses in such a manner that the current passed to the welding electrodes by the control unit is progressively increased from a low value to a higher value during the initial part of the welding operation.

4. A welding machine according to claim 1, wherein the power source is a source of alternating current and said control unit comprises a controlled rectifier, and wherein said pulse generator is connected to feed said control pulses to said controlled rectifier to trigger said controlled rectifier during each half cycle of the supply current, whereby any change in phase between the supply current and the control pulses varies the power passed by said control unit.

* * * * *

UNITED STATES PATENT OFFICE
CERTIFICATE OF CORRECTION

Patent No. 4,001,539      Dated January 4, 1977

Inventor(s) Adriano Franchi et al.

It is certified that error appears in the above-identified patent and that said Letters Patent are hereby corrected as shown below:

IN THE ABSTRACT

Lines 7, 9 and 10, "energy", each occurrence, should read -- power --.

Signed and Sealed this

Thirty-first Day of May 1977

[SEAL]

Attest:

RUTH C. MASON
*Attesting Officer*

C. MARSHALL DANN
*Commissioner of Patents and Trademarks*